US010134440B2

(12) United States Patent
Jiang et al.

(10) Patent No.: US 10,134,440 B2
(45) Date of Patent: Nov. 20, 2018

(54) VIDEO SUMMARIZATION USING AUDIO AND VISUAL CUES

(75) Inventors: Wei Jiang, Fairport, NY (US);
Alexander C. Loui, Penfield, NY (US);
Courtenay Cotton, New York, NY (US)

(73) Assignee: KODAK ALARIS INC., Rochester, NY (US)

( * ) Notice: Subject to any disclaimer, the term of this patent is extended or adjusted under 35 U.S.C. 154(b) by 30 days.

(21) Appl. No.: 13/099,391

(22) Filed: May 3, 2011

(65) Prior Publication Data
US 2012/0281969 A1 Nov. 8, 2012

(51) Int. Cl.
*G11B 27/034* (2006.01)
*G11B 27/11* (2006.01)

(52) U.S. Cl.
CPC ............ *G11B 27/034* (2013.01); *G11B 27/11* (2013.01)

(58) Field of Classification Search
CPC ........ H04N 5/783; H04N 5/775; H04N 5/445; H04N 7/173; G06F 3/00; G06F 13/00; G11B 27/031; G11B 20/10527; G10L 13/033
USPC ....... 386/285, 214, 224, 228, 283, 297, 248, 386/343; 375/E5.004, E7.071, E7.13, 375/E7.25, 240.01, E7.001; 382/190, 382/225, 306; 700/94; 704/204, 216, 704/219, 231, 273, E11.002, E17.009, 704/E17.028, E19.039, 278; 707/708, 707/E17.009, E17.028, E17.03, 769; 706/20; 715/201, 703, 723; 725/90, 94, 725/51, 112, 9, 13, 135; 369/53.34,
(Continued)

(56) References Cited

U.S. PATENT DOCUMENTS

| 6,345,028 | B1* | 2/2002 | Jaeger .............................. 369/84 |
| 6,567,775 | B1* | 5/2003 | Maali et al. .................. 704/231 |
| 7,233,832 | B2* | 6/2007 | Friedman ................ G10L 21/04 |
| | | | 369/3 |
| 7,356,830 | B1* | 4/2008 | Dimitrova ........................ 725/51 |
| 7,703,117 | B2* | 4/2010 | Hejna, Jr. ........................ 725/90 |

(Continued)

OTHER PUBLICATIONS

Money et al., "Video summarisation: A conceptual framework and survey of the state of the art," Journal of Visual Communication and Image Representation, vol. 19, pp. 121-143 (2008).
(Continued)

*Primary Examiner* — Thai Tran
*Assistant Examiner* — Syed Hasan
(74) *Attorney, Agent, or Firm* — Hogan Lovells US LLP

(57) ABSTRACT

A method for producing an audio-visual slideshow for a video sequence having an audio soundtrack and a corresponding video track including a time sequence of image frames, comprising: segmenting the audio soundtrack into a plurality of audio segments; subdividing the audio segments into a sequence of audio frames; determining a corresponding audio classification for each audio frame; automatically selecting a subset of the audio segments responsive to the audio classification for the corresponding audio frames; for each of the selected audio segments automatically analyzing the corresponding image frames to select one or more key image frames; merging the selected audio segments to form an audio summary; forming an audio-visual slideshow by combining the selected key frames with the audio summary, wherein the selected key frames are displayed synchronously with their corresponding audio segment; and storing the audio-visual slideshow in a processor-accessible storage memory.

19 Claims, 6 Drawing Sheets

(58) Field of Classification Search
USPC .................. 369/59.26, 84, 124.08; 370/231;
348/E5.051; 381/94.1; 709/238
See application file for complete search history.

(56) References Cited

U.S. PATENT DOCUMENTS

| | | | | |
|---|---|---|---|---|
| 8,059,936 | B2* | 11/2011 | Chen et al. ................ | 386/248 |
| 8,184,536 | B2* | 5/2012 | Wang et al. ................ | 370/231 |
| 2003/0093790 | A1* | 5/2003 | Logan ............... | G06F 17/30265 725/38 |
| 2004/0041831 | A1* | 3/2004 | Zhang ............... | G06F 17/30811 715/723 |
| 2005/0075863 | A1* | 4/2005 | Jiang et al. ................ | 704/205 |
| 2006/0056507 | A1* | 3/2006 | Chen et al. ................ | 375/240.01 |
| 2006/0129909 | A1* | 6/2006 | Butt et al. ................ | 715/500.1 |
| 2006/0149693 | A1* | 7/2006 | Otsuka et al. ................ | 706/20 |
| 2006/0251385 | A1* | 11/2006 | Hwang et al. ................ | 386/54 |
| 2007/0067724 | A1* | 3/2007 | Takahashi et al. ............ | 715/723 |
| 2008/0019669 | A1* | 1/2008 | Girshick et al. ............. | 386/117 |
| 2010/0168881 | A1* | 7/2010 | Weber et al. ................ | 700/94 |
| 2010/0211693 | A1* | 8/2010 | Master et al. ................ | 709/238 |
| 2011/0010168 | A1* | 1/2011 | Yu et al. ................ | 704/219 |
| 2012/0041937 | A1* | 2/2012 | Dhillon et al. ............. | 707/708 |
| 2012/0070091 | A1* | 3/2012 | Saund ................ | 382/225 |
| 2012/0099793 | A1* | 4/2012 | Kumar et al. ................ | 382/190 |

OTHER PUBLICATIONS

Forlines et al., "Subjective assessment of consumer video summarization," SPIE Conf. Multimedia Content Analysis, Management and Retrieval, vol. 6073, pp. 170-177 (2006).

Loui et al., "Kodak's consumer video benchmark data set: concept definition and annotation," Proc. International Workshop on Multimedia Information Retrieval, pp. 245-254 (2007).

Chen et al., "Speaker, environment and channel change detection and clustering via the Bayesian information criterion," DARPA Broadcast News Transcription and Understanding Workshop, pp. 127-132 (1998).

Mermelstein, "Distance measures for speech recognition—psychological and instrumental," Joint Workshop on Pattern Recognition and Artificial Intelligence, pp. 91-103 (1976).

Scheirer et al., "Construction and evaluation of a robust multifeature speech/music discriminator," IEEE International Conference on Acoustics, Speech, and Signal Processing, vol. 2, pp. 1331-1334 (1997).

Chou et al., "Robust singing detection in speech/music discriminator design," IEEE International Conference on Acoustics, Speech, and Signal Processing, vol. 2, pp. 865-868 (2001).

Parker, "An empirical study of feature extraction methods for audio classification," IEEE International Conference on Pattern Recognition, pp. 4593-4596 (2010).

Jiang et al., "Automatic aesthetic value assessment in photographic images," IEEE International Conference on Multimedia and Expo, pp. 920-925 (2010).

Ke et al., "The design of high-level features for photo quality assessment," IEEE Conference on Computer Vision and Pattern Recognition, vol. 1, pp. 419-426 (2006).

Omron Global, "Leading the World with Face Detection Technology," http://www.omron.com/r_d/technavi/vision/okao/detection.html.

* cited by examiner

VIDEO SUMMARIZATION USING AUDIO AND VISUAL CUES

FIELD OF THE INVENTION

The present invention relates to constructing an audio-visual slideshow summarizing a video sequence by analyzing the audio and visual content.

BACKGROUND OF THE INVENTION

The proliferation of digital cameras has led to an explosion in the number of digital videos that are captured and stored in consumer collections. This has created a demand for automated tools for efficient browsing, searching, and utilization of videos in large personal video collections.

Video summarization is a mechanism to produce a condensed or summarized version of an original video sequence by analyzing the underlying content in the entire video stream. Video summarization is an important tool to facilitate video browsing and search, and has been extensively explored in the prior art. A wide variety of types of information have been utilized in video summarization processes, including text descriptions, visual appearances, and audio sounds. A relatively comprehensive survey can be found in the article by Money et al., entitled "Video summarisation: A conceptual framework and survey of the state of the art" (Journal of Visual Communication and Image Representation, Vol. 19, pp. 121-143, 2008).

Most previous video summarization work has been designed to process videos with a high quality level (e.g., videos having a relatively high resolution, stable camera position, and low background noise in both audio and visual signals). Specifically, they have mainly focused upon certain professional video genres such as sports, news, TV drama, or movie dialog. As yet, little work has been done to provide methods that are well-suited for use with consumer-quality videos, which are typically captured under uncontrolled conditions and have diverse content and quality characteristics.

One major reason that research on consumer video summarization is lacking is because of the challenging issues of content analysis in consumer-quality videos. First, in contrast to videos from sporting events or television dramas, there is typically a lack of specific domain knowledge to guide video summarization systems due to the diverse video content characteristics.

Second, a consumer video typically has one long shot, with challenging conditions such as uneven illumination, clutter, occlusions, and complicated motions of objects and the camera. Additionally, the audio soundtrack includes multiple sound sources in the presence of high levels of background noise. As a result, it is difficult to identify specific objects or events from the video sequences, and it is hard to identify semantically meaningful audio segments. Consequently, methods that rely upon object/event detection or special sound effect detection cannot be easily applied to consumer video sequences.

Some prior art non-domain specific video summarization methods rely on an accurate knowledge of object/camera motion. Since it is difficult to accurately assess this information from consumer video sequences, such methods generally do not perform well either.

Another barrier to the development of video summarization methods for use with consumer videos is the difficulty in assessing a user's satisfaction with the generated video summaries. Previous studies, such as that described by Forlines et al. in the article entitled "Subjective assessment of consumer video summarization" (SPIE Conf. Multimedia Content Analysis, Management and Retrieval, Vol. 6073, pp. 170-177, 2006), show that due to the subjective nature of the problem, the actual consumer needs can only be determined from in-depth user studies.

There remains a need for a robust video summarization method that can be applied to consumer video sequences.

SUMMARY OF THE INVENTION

The present invention represents a method for producing an audio-visual slideshow for a video sequence having an audio soundtrack and a corresponding video track including a time sequence of image frames, comprising:

using a data processor to automatically analyze the audio soundtrack to segment the audio soundtrack into a plurality of audio segments;

subdividing the audio segments into a sequence of audio frames having a predefined time interval;

automatically analyzing the audio frames to determine a corresponding audio classification for each audio frame;

automatically selecting a subset of the audio segments responsive to the audio classification for the corresponding audio frames;

for each of the selected audio segments automatically analyzing the corresponding image frames in the video track to select one or more key image frames;

merging the selected audio segments to form an audio summary;

forming an audio-visual slideshow by combining the selected key frames with the audio summary, wherein the selected key frames are displayed synchronously with their corresponding audio segment; and storing the audio-visual slideshow in a processor-accessible storage memory.

This invention has the advantage that it can robustly form audio-visual slideshows from consumer-quality videos.

It has the additional advantage that it is adapted to automatically select diverse audio segments and diverse key frames for inclusion in the audio-visual slideshow.

DETAILED DESCRIPTION

In the following description, some embodiments of the present invention will be described in terms that would ordinarily be implemented as software programs. Those skilled in the art will readily recognize that the equivalent of such software can also be constructed in hardware. Because image and video manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein can be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
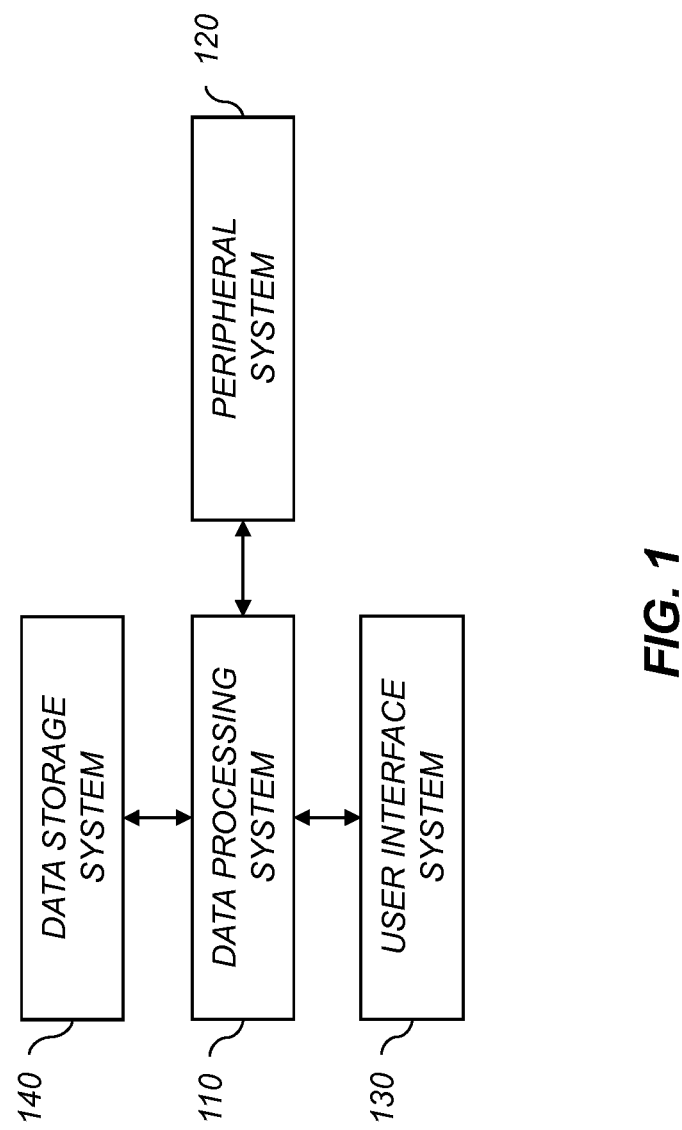
FIG. 1 is a high-level diagram showing the components of a system for producing an audio-visual slideshow according to an embodiment of the present invention.

FIG. 1 is a high-level diagram showing the components of a system for producing an audio-visual slideshow for a video sequence according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

The present invention addresses the challenging, practical issue of summarizing general consumer-quality videos. A case study was conducted using consumer videos captured by typical consumers. From the case study, a set of consumer-oriented guidelines were obtained. These guidelines reflect the high-level semantic rules, in both visual and audio aspects, that are recognized by consumers as being important to produce good video summaries. Following the guidelines, a video summarization method was developed that utilizes both audio and visual information to produce audio-visual slideshows for consumer-quality videos. Specifically, the approach takes into account the following factors: audio segmentation and classification, audio diversity, visual diversity, facial quality, and overall image quality.

The aforementioned case study was conducted with a group of five users representing typical consumers. In the case study, videos were restricted to be from four popular consumer categories: "birthday," "wedding," "performance," and "parade." Due to the uncontrolled content of consumer videos and the subjective nature of the task, such a restriction was necessary to make it possible that some common guidelines suitable for automatic video summarization could be found. A total of 50 videos were collected, 32 with VGA quality from a consumer benchmark video set described by Loui et al. in the article "Kodak's consumer video benchmark data set: concept definition and annotation" (Proc. International Workshop on Multimedia Information Retrieval, pp. 245-254, 2007), and 18 additional videos with HD quality. The average length of these videos was about 80 seconds.

Based upon the rationale that it might be easier for users to decide what was wrong with a summary than to come up with a set of rules for an ideal summary, the study was conducted in the following way: automatic video summaries were first generated in a traditional way, and then these summaries were provided to users to obtain their comments. The automatic video summaries were constructed as follows. In the audio aspect, based upon a "naive" assumption that sounds surrounding audio energy peaks were more interesting, the N highest audio energy peaks (that were sufficiently separated from one another) were selected, and an M-second audio clip was taken, centered on each peak. These audio clips were ordered chronologically and combined to produce an audio summary of the video.

In the visual aspect, for each selected audio clip, a set of 5×5 grid-based color moments were computed over image frames from the corresponding synchronized time window, and these frames were grouped into K clusters by a K-means algorithm. The image frames that were closest to each of the K cluster centers were then put together in chronological order to form the visual summary. The audio and visual summaries were finally combined into a video summary (i.e., an audio-visual slideshow) for users to evaluate. In practice, different combinations were tried with N=3 and 5; M=3 and 5 seconds, and K=3, 5 and 10. The responses indicated that N=5 video clips having a length of M=3 seconds each was the most favorable choice, and that K=3 or 5 was better than 10.

The rationale behind this video summarization process was the importance of the audio signal in the video stream in the consumer domain. As mentioned previously, the consumer videos generally contained single long shots, where visual appearances did not change as dramatically as did audio sounds. The importance of the audio signal was also confirmed by users in the case study where such audio-driven summaries were considered much more pleasant than alternative visual-driven ones (conducting key frame selection first and then choosing audio clips surrounding key frames).

Although there was significant disagreement among users, some common high-level principles stood out from the users' comments collected during the case study. In the audio aspect, audio clips where the names of people were mentioned (e.g., during birthday songs or wedding announcements) should be included. Also, audio clips should start and end at phrase boundaries when they included speeches. In general, video summaries should contain representative examples of all or many of the different semantic classes of sounds that appeared in each video. For example, if a video contained audio clips of music, speech, singing, and applause, the summary should include a reasonable mix of these sound categories. In the visual aspect, clear shots of important people, such as the birthday person or the wedding couple, should be included. It was also important to avoid image frames with negative qualities like blur, obstruction, or over/under exposure. If there were faces of reasonable size, the faces included should be clear with good quality. In addition, visual summaries should include representative examples of all or many of the different scenes that appeared in each video.

From the above principles the following guidelines can be obtained for automatic video summarization:

1. The video summary should include a varied subset of the different types of audio sounds present in a video sequence. While the most important audio types depend somewhat upon the particular video types, four audio types were recognized to be important by users for the four consumer categories that were studied: "singing," "applause," "speech," and "music". Therefore, the video summary should include a mix of audio segments where these audio types are present.
2. The video summary should maintain the variety of audio sounds present in the video segment. For example, if the audio soundtrack includes multiple stages such as different pieces of music, the video summary needs to include audio segments from each of these stages.
3. The audio segments included in the video summary should begin and end at reasonable boundary points so that the result is not jarring to the ear. Where appropriate, the audio segments should preferably begin and end at phrase boundaries.
4. The video summary should include key image frames with good overall image quality. Additionally, any faces included in the key image frames should have a high level of image quality.
5. The video summary should maintain the variety of visual scenes in the video sequence. If the video sequence includes multiple scenes, the video summary should include key image frames from each of the different visual scenes.

A number of other high-level principles were also gleaned from the users' comments collected during the case study. For example, selected audio segments should include a person's entire name; selected audio segments should include key sentences in a speech; and selected key image frames should include the most important persons in the video sequence. Automatically forming video summaries according to these principles would require advanced signal processing that is currently impractical for most consumer applications. For example, reliably identifying names in a noisy audio soundtrack is a problem that is difficult to solve without additional training information and high-power computing systems. However, as advanced audio and visual signal processing methods are developed, and as the capabilities of consumer computing systems continue to advance, it will be desirable to incorporate these high-level principles into the video summarization process.

Figure 2:
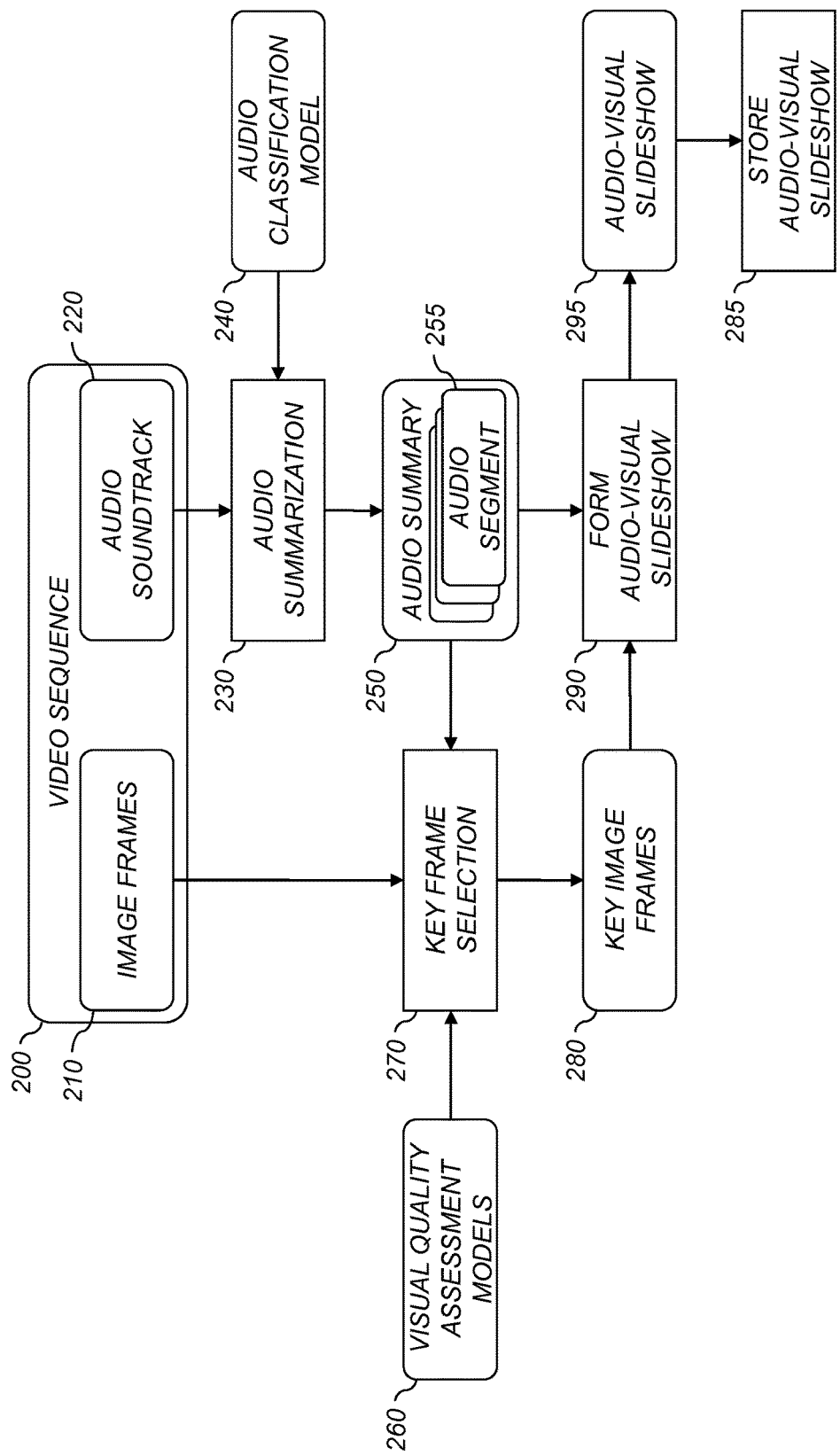
FIG. 2 is a high-level flow diagram of a method for forming an audio-visual slideshow according to an embodiment of the present invention.

FIG. 2 is a high-level diagram showing a method for automatic video summarization system according to an embodiment of the present invention. The method uses both audio and visual cues in the video summarization process in order to automatically provide a high quality audio-video slideshow. The input to the process is a video sequence 200, including a video track having a time sequence of image frames 210 and a corresponding audio soundtrack 220. An audio summarization system step 230 is applied to the audio soundtrack 220 to generate an audio summary 250 according to a specified audio classification model 240. The audio summary 250 includes a set of audio segments 255 that are extracted from the audio soundtrack 220. Additional details of the audio summarization system step 230 according to a preferred embodiment will be described with reference to FIG. 3.

A key frame selection step 270 is used to determine a set of key image frames 280 by analyzing the image frames 210 according to one or more visual quality assessment models 260. The set of key image frames 280 include one or more key image frames for each of the audio segments 255.

A form audio-visual slideshow step 290 combines the audio summary 250 and the key image frames 280 to form an audio-visual slideshow 295 where the key image frames 280 are displayed synchronously with their corresponding audio segments 255.

The resulting audio-visual slideshow 295 is then stored in a processor-accessible memory using a store audio-visual slideshow step 285. The audio-visual slideshow 295 can be stored in a variety of different formats. In some embodiments, the audio-visual slideshow 295 is stored as a video file using a standard video file format adapted to be played using a standard video player. In this case, the key image frames 280 repeated for an appropriate time interval in order to synchronize them with the corresponding audio segment 255. For example, if three key image frames 280 are selected for a particular audio segment 255 that is 1.5 seconds long, then each of the key image frames would be repeated for 0.5 seconds. In other embodiments, the audio-visual slideshow 295 can be stored in some other file format that supports the storage of a slideshow with an accompanying audio track. Such file formats would include various versions of the Microsoft PowerPoint file format and the Adobe Postscript file format.

Figure 3:
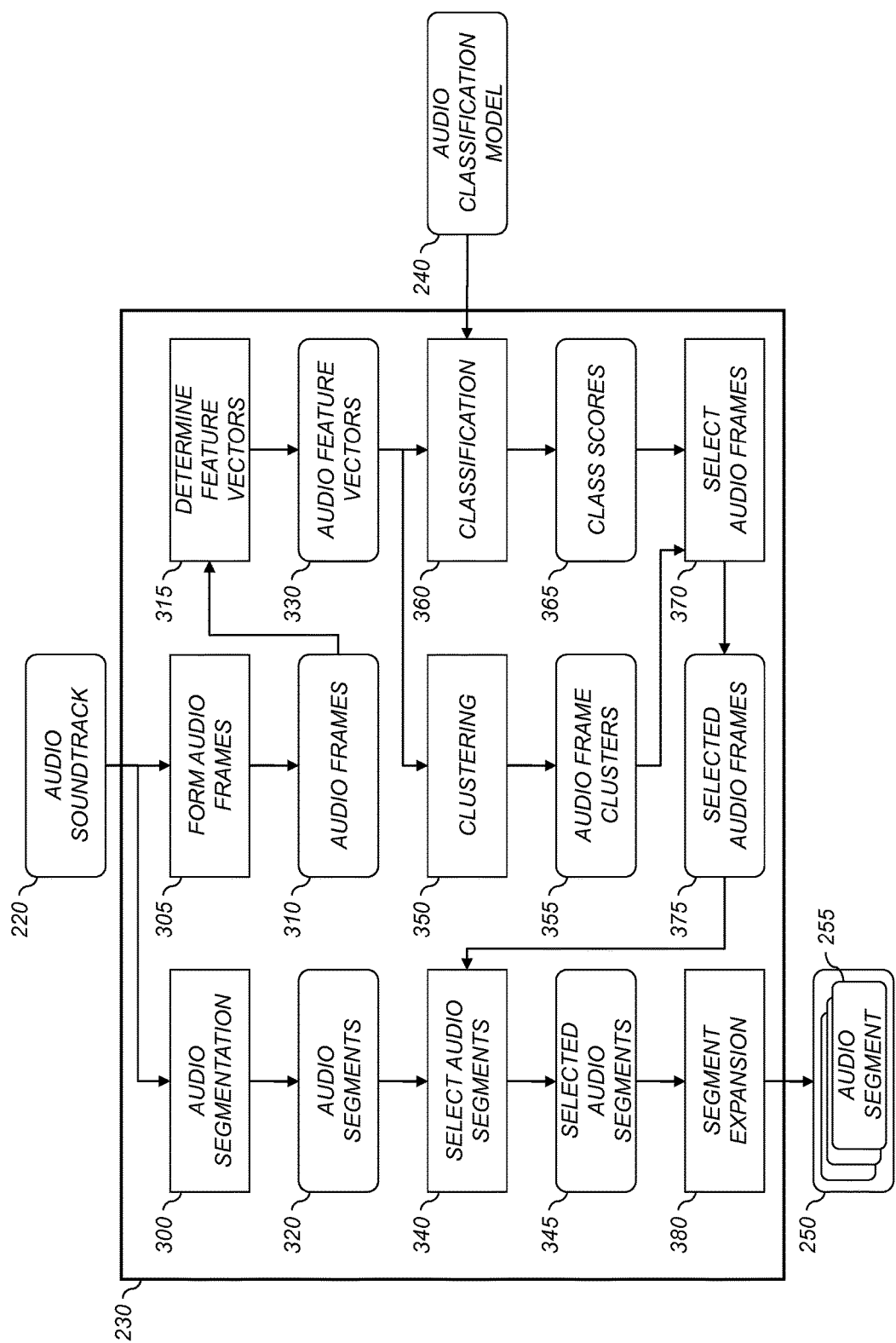
FIG. 3 is a flow diagram showing additional details for the audio summarization step in FIG. 2.

A preferred embodiment of the automatic audio summarization step 230 will now be described with reference to FIG. 3. An audio segmentation step 300 is used to subdivide the audio soundtrack 220 into a set of audio segments 320. As observed from the above-described case study, it is important to automatically select start and end points of the audio segments 320 at reasonable boundaries so that the resulting audio summary 250 is not jarring to the ear. To this end, the audio segmentation step 300 preferably includes a change detection operation to identify appropriate boundaries in the audio soundtrack 220. In a preferred embodiment, the change detection operation uses the Bayesian Information Criterion (BIC) described by Chen et al. in the article "Speaker, environment and channel change detection and clustering via the Bayesian information criterion" (DARPA Broadcast News Transcription and Understanding Workshop, pp. 127-132, 1998), which is incorporated herein by reference. This approach uses sliding time windows at various scales to select points at which the audio on either side is better described by two separate Gaussian distributions rather than by a single Gaussian distribution.

In a preferred embodiment, the audio segments 320 are analyzed to identify audio segments 320 where the four important audio types ("singing," "applause," "speech," and "music") are present. Any audio classification method known in the art can be used to classify the audio segments 320. In a preferred embodiment, a supervised classification approach is used to enable a select audio segments step 340 to select an appropriate set of selected audio segments 345. According to this approach, the audio soundtrack 220 is first separated into a set of short audio frames 310 using a form audio frames step 305. For example, the form audio frames step 305 can provide audio frames 310 that are 25 msec long separated by 10 msec hops.

A determine feature vectors step 315 is used to extract an audio feature vector 330 corresponding to each of the audio frames 310. The audio feature vectors 330 can include a variety of different audio features in accordance with various embodiments of the present invention. In an example embodiment, the audio feature vectors 330 includes a set of audio features corresponding to the well-known mel-frequency cepstral coefficients (MFCC) and their differences. The computation of mel-frequency cepstral coefficients is described by Mermelstein in the article entitled "Distance measures for speech recognition—psychological and instrumental" (Joint Workshop on Pattern Recognition and Artificial Intelligence, pp. 91-103, 1976), which is incorporated herein by reference.

Due to the poor discrimination ability of the MFCC features for the "speech" and "singing" audio types, some additional more specialized features are also used. In the example embodiment, the audio feature vectors 330 also include the 4-Hz modulation energy feature described by Scheirer et al., in the article entitled "Construction and evaluation of a robust multifeature speech/music discriminator" (IEEE International Conference on Acoustics, Speech, and Signal Processing, Vol. 2, pp. 1331-1334, 1997), which is incorporated herein by reference. This audio feature has been shown as a state-of-the-art for distinguishing the "speech" audio type from the "music" audio type.

In the example embodiment, the audio feature vectors 330 also include the harmonic coefficient described by Chou et al. in the article entitled "Robust singing detection in speech/music discriminator design" (IEEE International Conference on Acoustics, Speech, and Signal Processing, Vol. 2, pp. 865-868, 2001) is computed, which is the maximum of the frame-level auto-correlation. This audio feature is expected to be high for the "singing" audio type and low for "speech" audio type and the "music" audio type. All of these audio features are determined for each of the audio frames 310 and are concatenated together into a single corresponding audio feature vector 330.

A classification step 360 is used to determine class scores 365 for each of the audio frames 310 responsive to the audio feature vectors 330 according to the audio classification model 240. Various types of audio classification models 240 can be used in accordance with the present invention. In a preferred embodiment, the audio classification model 240 is a well-known Support Vector Machine (SVM) model, which is trained to classify the audio frames into a set of audio types including the four audio types mentioned earlier.

The SVM model is trained using ground-truth data for a typical set of consumer videos. It is important that the ground-truth data include audio data that is representative of the challenging conditions associated with consumer-quality videos (e.g., soundtracks including environment/background noise and simultaneous mixtures of multiple sounds corresponding to different audio types). One such set of ground-truth data is described by Parker in the article entitled "An empirical study of feature extraction methods for audio classification" (IEEE International Conference on Pattern Recognition, pp. 4593-4596, 2010), which is incorporated herein by reference. This article describes a large-scale consumer audio data set containing 2.25 hours of audio data collected from 203 consumer-captured video sequences, which was manually assigned to 10 classes corresponding to 10 different audio types, including the four audio types used in the current example. Based upon this consumer audio ground-truth data set, SVM classifiers were trained for each of the four audio types.

The object of the classification step 360 is not to determine class scores 365 that labels each audio frame 310 with a distinct audio type. It is sufficient to determine which parts of an audio soundtrack are most likely to contain the various audio types (i.e., "applause," "music," "singing," or "speech"). In a preferred embodiment, the class scores 365 are indications of the relative probability that a particular audio frame 310 contains content that would be classified in the various audio types.

As discussed in the aforementioned case study by Parker, it is desirable for the audio summary 250 to include a mix of audio segments 255 where the four audio classes are present, and to include various examples reflecting different stages of the audio. To address these issues, a clustering step 350 is used to cluster the audio frames 310 into audio frame clusters 355 having similar audio characteristics. In a preferred embodiment, the audio feature vectors 330 are analyzed using a well-known K-means clustering algorithm to determine a set of N clusters of image frames. The largest M clusters are retained as the audio frame clusters 355, where M is determined by the percentage P of audio frames 310 in the M clusters.

A select audio frames step 370 is used to select a set of selected audio frames 375 responsive to the audio frame clusters 355 and the class scores 365. In a preferred embodiment, K=4 selected audio frames 375 are selected from each audio frame cluster 355. The selected audio frames 375 correspond to the audio frames in a particular audio frame cluster 355 that have the highest class scores 365 for each of the four audio classes. In some embodiments, no audio frame is selected for a particular audio type if the highest class score 365 for the particular audio type is too low (i.e., the highest class score 365 is less than a predefined threshold). In such cases, the number of selected audio frames 275 for some of the audio frame clusters 355 may be less than four (i.e., K<4).

Next, a select audio segments step 340 is used to select a set of selected audio segments 345 responsive to the selected audio frames 375. Generally, it will be desirable for the selected audio segments 345 to include audio frames from a diverse set of audio frame clusters 355 and a diverse set of audio classifications. In a preferred embodiment, the selected audio segments 345 are those audio segments 320 that contain the selected audio frames 375. For the case where K=4 selected audio frames 375 are selected from each audio frame cluster 355, the number of selected audio segments 345 will Q=4×M. In practice, the number of selected audio segments 345 will often be smaller than this since some audio frame cluster 355 can have K<4 selected audio frames 375, and because some of the selected audio frames 375 may be contained in the same audio segment 320.

A segment expansion step 380 is used to expand the selected audio segments 340 where appropriate to provide the audio segments 255 for the audio summary 250. In a preferred embodiment, the segment expansion step 380 expands each of the selected audio segments 340 to have a minimum time duration (if possible) by alternately appending additional audio segments 320 before and after the selected audio segment 340 until the total duration of the audio segment 255 exceeds a predefined threshold time duration of L seconds. Preferably, the majority of audio frames 310 in the expanded audio segment 255 should be from the same audio frame cluster 355 as the majority of audio frames 310 in the selected audio segment 345 (i.e., the expanded audio segment 255 should sound similar to the selected audio segment 345) to avoid including annoying changes. The following parameter values were found to generally produce good results during testing of the present invention: N=5, P=60%, and L=3 seconds. Using these parameters, it was found that audio summaries 250 determined according to the method of FIG. 3 typically include 3 to 4 audio segments, and have an average length of about 19 seconds.

It is generally desirable to sort the audio segments 255 into chronological order before they are concatenated together to form the audio summary 250. This reflects the fact that users typically want to hear the audio segments 255 in the order in which they appeared in the original video sequence 200 (FIG. 2). In a preferred embodiment, linear fades are used to provide smooth transitions between the audio segments 255 in the audio summary 250.

Figure 4:
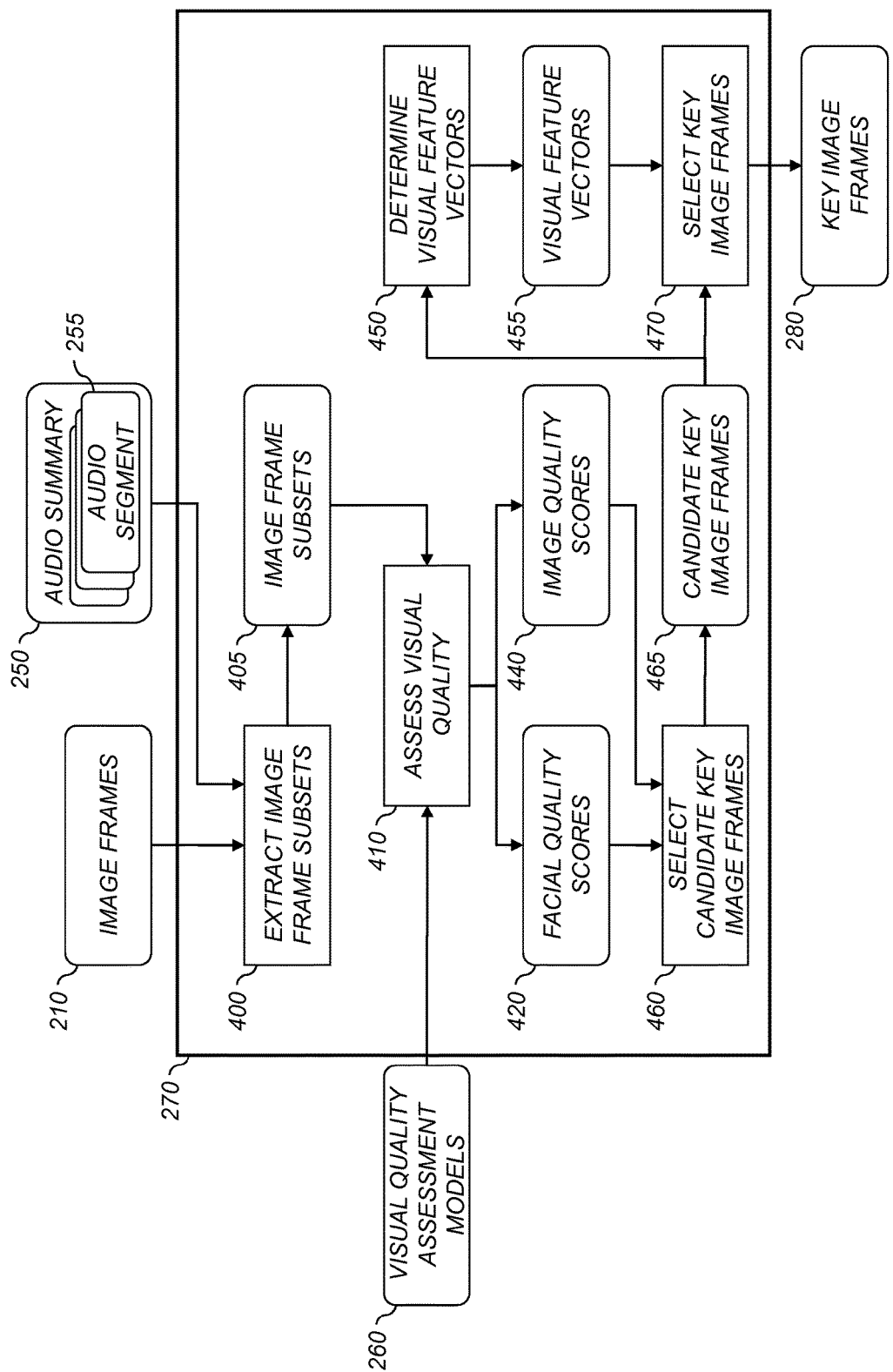
FIG. 4 is a flow diagram showing additional details for the key frame selection step in FIG. 2.

A preferred embodiment of the automatic key frame selection step 270 will now be discussed with reference to FIG. 4. For each audio segment 255 that makes up the audio summary 250, a set of representative key image frames is selected to generate the set of key image frames 280. The key image frames 280 will accompany the audio summary 250 to form the final audio-visual slideshow 295 (FIG. 2).

A key frame selection strategy is used that addresses the aforementioned guidelines developed from the case study. Namely, that the key image frames 280 should be selected to include clear, high quality faces and to have good overall image quality. The key frame selection approach jointly considers three aspects: the overall quality of the image frames, the quality of detected faces in the image frames, and the visual diversity of the selected key image frames.

An extract image frames subsets step 400 is used to identify a set of image frame subsets 405. Each image frame subset 405 includes a set of image frames 210 corresponding to each of one of the audio segments 255. In a preferred embodiment, only a sampling of the image frames 210 for a given audio segment 255 are included in the corresponding image frame subset 405. Specifically, image frames 210 are sampled from the synchronized time window at regular time intervals (e.g., 0.1 seconds).

The visual quality of the image frames in the image frame subsets 405 is evaluated using an assess visual quality step 410 according to the visual quality assessment models 260. Various visual quality assessment models 260 can be used in accordance with the present invention. In a preferred embodiment, the visual quality assessment models 260 include an algorithm for determining facial quality scores 420, and a model for determine overall image quality scores 440.

Jiang et al., in the article entitled "Automatic aesthetic value assessment in photographic images" (IEEE International Conference on Multimedia and Expo, pp. 920-925, 2010), which is incorporated herein by reference, have described a predictive algorithm for assessing visual image quality that can be leveraged for use as a visual quality assessment model 260. With this approach, a set of visual features that described various characteristics related to image quality and aesthetic values were used to generate multi-dimensional feature spaces. Machine learning algorithms were developed to estimate an image's aesthetic visual quality as a function of these visual features. This algorithm was developed based upon a ground-truth data set containing 450 real consumer photographic images selected from a number of different sources: Flickr®, Kodak Picture of the Day, study observers, and an archive of recently captured consumer image sets. Ground-truth aesthetic quality values (ranging from 0 to 100) for the 450 images were obtained through a user study with 30 observers. Regression models were built based upon various visual features to estimate the aesthetic visual quality values of new images.

It is worth noting that there are some significant differences between consumer photographic images and the image frames 210 from consumer videos. In particular, the image frames 210 from consumer videos will generally have much lower visual quality levels due to lower spatial resolution and higher levels of motion artifacts. Therefore, some of the visual features used for the visual quality models trained using consumer photographic images are less appropriate for use in assessing image frames 210 from consumer videos.

In a preferred embodiment, the best performing visual features described by Ke et al. in the article "The design of high-level features for photo quality assessment" (IEEE Conference on Computer Vision and Pattern Recognition, Vol. 1, pp. 419-426, 2006), which is incorporated herein by reference, are used in the determination of the image quality scores 440. In particular, the spatial distribution of high-frequency edges, the color distribution, the hue entropy, the blur degree, the color contrast, and the brightness (6 dimensions) are computed as visual features for use by the visual quality assessment models 260. The assess visual quality step 410 computes a feature vector including this set of visual features for each image frame in the image frame subsets 405. A regression model trained using the ground-truth images is then applied to determine image quality scores 440 representing estimates of the aesthetic visual quality. The image frames 210 in each image frame subset 405 are then ranked according to their image quality scores 440 in descending order.

In addition to measuring the overall image quality, the assess visual quality step 410 also determines facial quality scores 420 for each image frame 210 in the image frame subsets 405. In a preferred embodiment, a face detection tool available from Omron Global of Tokyo, Japan is applied to the image frames 210 to detect the presence of any faces. However, any other face detection technology known in the art can also be used in various embodiments. For the image frames 210 having detected faces, visual features corresponding to the color contrast and the blur degree of the most confidently detected face region are computed. Corresponding facial quality scores 420 are then computed from the visual features. The larger the value of the color contrast and the lower the value of the blur degree, the higher the corresponding facial quality score 420 will be. For image frames 210 without any detected faces, the facial quality score 420 is simply set to zero.

A select candidate key image frames step 460 is used to identify a set of candidate key image frames 465 responsive to the facial quality scores 420 and time image quality scores 440. In a preferred embodiment, the facial quality scores 420 and time image quality scores 440 are linearly combined to generate the overall visual quality scores. In some embodiments the weights applied to combine the facial quality scores 420 and time image quality scores 440 can be varied depending upon the type of video. For example, for "birthday" or "wedding," detecting clear faces of the birthday person or the wedding couple will be more important than in "parade" videos. However, in a preferred embodiment the same set of empirically-determined weights are used for all video categories for simplicity.

After the overall visual quality scores have been computed, the image frames 210 within each image frame subset 405 are ranked in descending order based upon the overall visual quality score and the highest-ranked image frames are selected as candidate key image frames 465.

As discussed earlier, it is also important to maintain diversity in the selected key image frames 280. To enable the key frame selection step 270 to evaluate the similarity of the candidate key image frames 465, a determine visual feature vectors step 450 is used to determine visual feature vectors 455 for the candidate key image frames 465. In a preferred embodiment, the aforementioned 5×5 grid-based color moments are used as visual features to define the visual feature vectors 455.

A select key image frames step 470 is used to select the set of key image frames 280 from the candidate key image frames 465. For each image frame subset 405 visual "distances" between the candidate key image frames 465 are determined based on differences between the corresponding visual feature vectors. The key image frames 280 can then be selected based on a visual diversity criterion, which preferentially selects the image frames separated by the largest visual distances are selected as the key image frames 280 (i.e., the image frames that are most visually diverse). In some embodiments, only image frames where the visual distance exceeds a predefined threshold are selected. In some cases, this can result in only a single key image frame 280 being selected for a given audio segment if all of the corresponding image frames 210 are very visually similar. The selected key image frames 280 are sorted into chronological order and are associated with their corresponding audio segments 255 in preparation for the form audio-visual slideshow step 290 (FIG. 2).

Several experiments were performed to assess performance of the above-described method for creating video summaries in the form of audio-visual slideshows 295 (FIG. 2). The experiments were conducted over the 50 consumer videos described earlier with reference to the case study. Two video summaries were generated for each of the 50 videos, one using the method shown in FIG. 2, and the other using the simple intuitive method described earlier with reference to the case study.

The summaries were presented to a total of seven amateur observers (representing typical consumers) for manual evaluation. The manual evaluation included a series of two tests. In the first test, the audio summaries 250 (without any accompanying image frames) were played for the observers so that the evaluation is only based upon the audio sound. In the second test, the audio-visual slideshows 295 were played for the observers subjects for a final evaluation. The reason for conducting the two tests was to determined whether the observer's understanding of the audio content in the video varies according to whether or not they see the visual image frames. In each run, the observers were asked to assign a quality score ranging from 0 (very poor) to 10 (perfect) to each of the two summaries for each of the consumer videos. The following are the instructions given to subjects for their evaluation:

Instructions for Test 1

Please listen to the original soundtrack first, and then assign a score to each of the two summaries. There are some factors to consider:

1. Does the summary capture the main content of the soundtrack? There can be multiple interpretations of the term "content," here are three examples:
   a. Overall semantic: if the soundtrack is about a wedding, can you tell from the summary that it is about wedding?
   b. Overall diversity: if you recognize different stages (segments) in the soundtrack, does the summary capture these stages or most of them?
   c. Special interests: besides the overall semantics, if some audio segments carry other semantic information that you think is important, e.g., person's name mentioned in a birthday song or wedding announcement, does the summary capture them?
2. Does the summary sound pleasing? This can be very subjective. A common concern is whether you think the way the summary cuts the soundtrack is annoying.

Instruction for Test 2

Please view the original video first, and then assign a score to each of the two summaries. There are some factors to consider:

1. The quality of the audio summary (this is the same with the previous task in Test 1)
2. The quality of visual key frames:
    a. Do the key frames capture the main content of the image sequence? Some possible interpretations of "visual content" are:
        i. Overall semantic: if it is a wedding video, can you tell from key frames that it is a wedding?
        ii. Overall visual diversity: if you recognize different scenes (subshots), do the key frames cover all or most of them?
        iii. Special interests: anything you think is semantically important, do the key frames cover them? For example, if the video has nice shots of the main person(s), such as the birthday person or the wedding couple, do the key frames capture them?
    b. Do the key frames look pleasing? This can be measured from two aspects:
        i. Do you think the key frames are technically and aesthetically pleasing?
        ii. Do the key frames have too much redundancy?

It was found that there was significant disagreement among the observers in terms of the absolute quality scores assigned to individual video summaries. Some observers were quite critical and assigned low scores to most video summaries, while other observers were more forgiving and assigned much higher scores for many video summaries. The following table gives the overall quality scores averaged across different videos and across different subjects for Test 1 and Test 2, where numbers in parentheses are standard deviations. The averaged results show that the proposed approach was rated better than the intuitive method on the average.

TABLE 1

Comparison of average quality scores.

|  | Intuitive Method | Current Method |
| --- | --- | --- |
| Test 1 | 6.74 (±0.97) | 7.47 (±1.22) |
| Test 2 | 6.23 (±0.45) | 7.18 (±0.64) |

To better account for the disagreement among the observers, quality score differences $\Delta Q$ were computed for each observer:

$$\Delta Q = Q_c - Q_p \quad (1)$$

where $Q_c$ is the quality score given to the audio summary or audio-visual slideshow produced using the current method, and $Q_p$ is quality score given to the audio summary or audio-visual slideshow produced using the prior art intuitive method.

Figure 5:
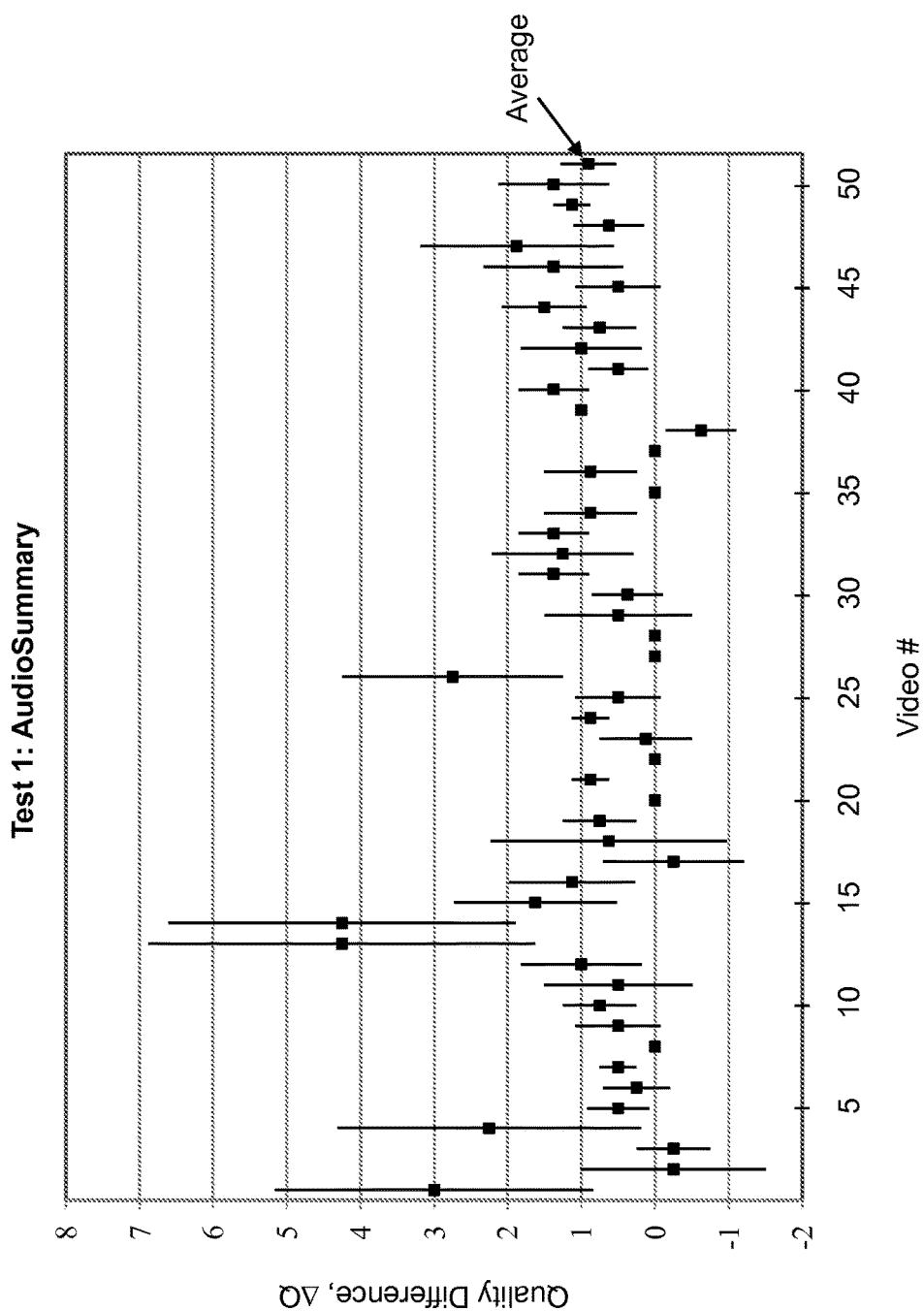
FIG. 5 is a graph showing quality score differences for audio summaries generated using the current method and a prior art method.
Figure 6:
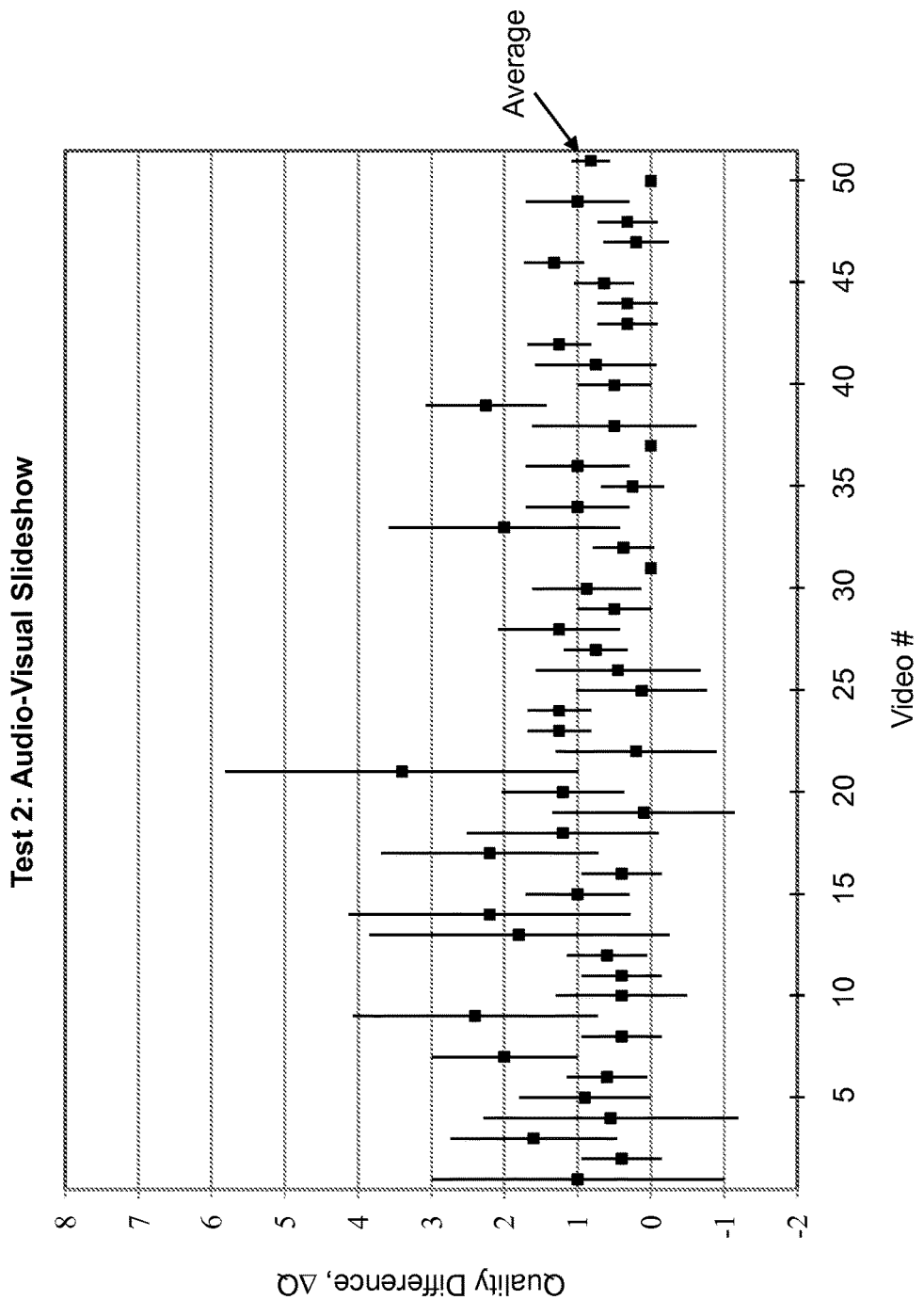
FIG. 6 is a graph showing quality score differences for audio-visual slideshows generated using the current method and a prior art method.

The resulting quality score differences on a per-video basis for Test 1 and Test 2 are shown in FIG. 5 and FIG. 6, respectively. The squares show the average quality score differences for each video across all of the observers, and the vertical lines represent the corresponding standard deviations of the quality score differences. A $51^{st}$ data point at the right side of each figure shows the average quality score difference across all of the videos. These figures clearly show the advantage of the current method over the prior art intuitive method, both for forming audio summaries 250, as well as for forming audio-visual slideshows 295. For the majority of the videos, the average quality score difference was positive, indicating the current method produced preferred results relative to the prior art intuitive method.

An examination of FIG. 5 shows that the audio summaries 250 produced with the current method were preferred for 39 of the 50 videos, while those produced with the prior art intuitive method were only preferred for 4 of the videos. The two methods scored approximately the same for 7 of the videos.

Similarly, an examination of FIG. 6 shows that the audio-visual slideshows 295 produced with the current method were preferred for 47 of the 50 videos, while those produced with the prior art intuitive method were not preferred for any of the videos. The two methods scored approximately the same for 3 of the videos. The quality scores for 25 of the videos improved by more than 10% on a relative basis. It can be seen that when the visual signal and audio signal are combined together to form the audio-visual slideshows 295, there is less confusion about the content of the videos, and the subjects agree with each other more frequently.

The invention has been described in detail with particular reference to certain preferred embodiments thereof, but it will be understood that variations and modifications can be effected within the spirit and scope of the invention.

PARTS LIST 110 data processing system
120 peripheral system
130 user interface system
140 data storage system
200 video sequence
210 image frames
220 audio soundtrack
230 audio summarization step
240 audio classification model
250 audio summary
255 audio segments
260 visual quality assessment models
270 key frame selection step
280 key image frames
285 store audio-visual slideshow step
290 form audio-visual slideshow step
295 audio-visual slideshow
300 audio segmentation step
305 form audio frames step
310 audio frames
315 determine feature vectors step
320 audio segments
330 audio feature vectors
340 select audio segments step
345 selected audio segments
350 clustering step
355 audio frame clusters
360 classification step
365 class scores
370 select audio frames step
375 selected audio frames
380 segment expansion step
400 extract image frame subsets step
405 image frame subsets
410 assess visual quality step
420 facial quality scores
440 image quality scores
450 determine visual feature vectors step
455 visual feature vectors
460 select candidate key image frames step
465 candidate key image frames
470 select key image frames step

The invention claimed is:

1. A method for producing an audio-visual slideshow from a video, comprising:
   receiving a video sequence, the video sequence comprising image frames and a corresponding audio soundtrack;
   dividing the audio soundtrack into audio frames, wherein the audio frames are divided based on a predefined time interval;
   extracting an audio feature vector from each of the audio frames;
   applying an audio classification model to the audio feature vectors, wherein the audio classification model determines a corresponding audio classification for each of the audio frames;
   using a clustering algorithm to form audio frame clusters, wherein the audio frame clusters comprise audio frames having a same corresponding audio classification;
   selecting an audio frame from each of the audio frame clusters;
   segmenting the audio soundtrack into audio segments using a change detection operation;
   selecting the audio segments that contain the selected audio frames;
   identifying a subset of the selected audio segments, wherein the subset of the selected audio segments includes selected audio frames from a diverse set of audio frame clusters;
   determining which of the image frames correspond to the selected subset of audio segments;
   selecting key image frames from the image frames corresponding to the selected subset of audio segments, wherein the selected number of key image frames is less than the total number of image frames that correspond to the selected subset of audio segments;
   merging the selected subset of audio segments to form an audio summary;
   combining the selected key image frames with the audio summary; and
   displaying the selected key image frames synchronously with their corresponding audio segments.

2. The method of claim 1, wherein the audio classification for each audio frame is determined using one or more audio classification models trained using a ground-truth data set.

3. The method of claim 2, wherein the one or more audio classification models comprises a support vector machine (SVM) model.

4. The method of claim 2, wherein a set of audio classification models are used to determine classification scores for each of a predetermined subset of the diverse set of audio frame clusters.

5. The method of claim 1, wherein the clustering algorithm comprises a K-means algorithm.

6. The method of claim 1, wherein identifying the subset of the selected audio segments includes:
   for each audio frame cluster, selecting an audio frame corresponding to each relevant audio classification; and
   selecting the audio segments that include the selected audio frames.

7. The method of claim 1, wherein the change detection operation to identify identifies appropriate audio segment boundaries corresponding to substantial changes in audio characteristics.

8. The method of claim 7, wherein applying the change detection operation comprises applying a Bayesian information criterion.

9. The method of claim 1, further comprising expanding the selected audio segments by appending to the selected audio segments one or more other audio segments having similar audio characteristics to the selected audio segments.

10. The method of claim 1, wherein selecting the key image frames comprises:
   identifying an image frame subset corresponding to a particular audio segment;
   determining one or more visual quality scores for each of the image frames in the image frame subset; and
   selecting one or more key image frames from the image frame subset responsive to the one or more visual quality scores.

11. The method of claim 10, wherein the image frame subset includes a sampling of the image frames corresponding to the particular audio segment.

12. The method of claim 10, wherein the one or more visual quality scores include a facial quality score and an overall image quality score.

13. The method of claim 12, wherein a determination of the facial quality score for a particular image frame comprises:
   analyzing the particular image frame using a face detection process to detect the presence of any faces;
   determining visual feature vectors for the detected presence of faces; and
   determining the facial quality score responsive to the visual feature vectors.

14. The method of claim 10, wherein the key image frames are selected according to a visual diversity criterion.

15. The method of claim 10, wherein selecting the one or more key image frames from the image frame subset responsive to the one or more visual quality scores comprises:
   identifying a set of candidate key image frames having the highest visual quality scores;
   determining a visual feature vector for each of the candidate key image frames;
   computing visual distance values between the candidate key image values responsive to the visual feature values; and
   selecting a subset of the candidate key image frames to be the key image frames responsive to the visual distance values.

16. The method of claim 15, wherein the selected number of key image frames are selected such that each of the selected number of key image frames are separated by a visual distance value that exceeds a predefined threshold visual distance value.

17. The method of claim 1, wherein the selected number of key image frames are sorted into chronological order.

18. The method of claim 1, wherein combining the selected key image frames with the audio summary forms an audio-visual slideshow and the audio-visual slideshow is stored in a video file using a video file format adapted to be played using a standard video player.

19. The method of claim 1, wherein each of the selected number of key image frames is displayed for a time interval, and wherein the time interval is determined by dividing the length of the selected audio segment by the selected number of key image frames for the respective selected audio segment.

* * * * *